(12) United States Patent
Lavoie

(10) Patent No.: US 9,296,422 B2
(45) Date of Patent: Mar. 29, 2016

(54) TRAILER ANGLE DETECTION TARGET PLAUSIBILITY

(71) Applicant: Ford Global Technologies, LLC, Dearborn, MI (US)

(72) Inventor: Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 82 days.

(21) Appl. No.: 14/313,310

(22) Filed: Jun. 24, 2014

(65) Prior Publication Data

US 2014/0309887 A1    Oct. 16, 2014

Related U.S. Application Data

(63) Continuation-in-part of application No. 14/301,919, filed on Jun. 11, 2014, which is a continuation-in-part of application No. 14/294,489, filed on Jun. 3, 2014, which is a continuation-in-part of application No.

(Continued)

(51) Int. Cl.
*H04N 7/18* (2006.01)
*B62D 13/06* (2006.01)
*B60W 30/00* (2006.01)

(Continued)

(52) U.S. Cl.
CPC ............ *B62D 13/06* (2013.01); *B60W 30/00* (2013.01); *B62D 15/027* (2013.01); *G01B 21/22* (2013.01); *H04N 7/183* (2013.01)

(58) Field of Classification Search
CPC ..... B62D 13/06; B62D 15/027; B60W 30/00; H04N 7/183; G01B 21/22

USPC ........................................................ 701/41
See application file for complete search history.

(56) References Cited

U.S. PATENT DOCUMENTS 4,430,637 A    2/1984   Koch-Ducker et al.
5,056,905 A    10/1991  Jensen (Continued)

FOREIGN PATENT DOCUMENTS

CN    101610420 A    12/2009
DE    3931518 A1     4/1991

(Continued)

OTHER PUBLICATIONS

Gouet-Brunet, V.; Lameyre, B., "Object recognition and segmentation in videos by connecting heterogeneous visual features", Computer Vision and Image Understanding, Jul. 2008, 2 pgs., vol. 111, Issue 1.

(Continued)

*Primary Examiner* — Richard Camby
(74) *Attorney, Agent, or Firm* — Raymond Coppiellie; Price Heneveld LLP

(57) ABSTRACT

According to one aspect of the present invention, a system for determining target plausibility is comprised of an imaging device for imaging a scene and generating image data, sensors for generating hitch angle measurements, steering angle measurements, and vehicle speed measurements. A controller in communication with the imaging device and the sensors, wherein when a driving condition is satisfied, the controller calculates a hitch angle and selects a plausible target from the imaged scene based on the image data and the calculated hitch angle.

20 Claims, 4 Drawing Sheets

Related U.S. Application Data

14/289,888, filed on May 29, 2014, which is a continuation-in-part of application No. 14/256,427, filed on Apr. 18, 2014, said application No. 14/294,489 is a continuation-in-part of application No. 14/257,420, filed on Apr. 21, 2014, which is a continuation-in-part of application No. 14/256,427, which is a continuation-in-part of application No. 14/249,781, filed on Apr. 10, 2014, which is a continuation-in-part of application No. 14/188,213, filed on Feb. 24, 2014, which is a continuation-in-part of application No. 13/847,508, filed on Mar. 20, 2013, and a continuation-in-part of application No. 14/068,387, filed on Oct. 31, 2013, now Pat. No. 9,102,271, which is a continuation-in-part of application No. 14/059,835, filed on Oct. 22, 2013, which is a continuation-in-part of application No. 13/443,743, filed on Apr. 10, 2012, now Pat. No. 8,825,328, which is a continuation-in-part of application No. 13/336,060, filed on Dec. 23, 2011, now Pat. No. 8,909,426, said application No. 14/249,781 is a continuation-in-part of application No. 14/161,832, filed on Jan. 23, 2014, which is a continuation-in-part of application No. 14/059,835, said application No. 14/249,781 is a continuation-in-part of application No. 14/201,130, filed on Mar. 7, 2014, which is a continuation-in-part of application No. 14/068,387.

(60) Provisional application No. 61/477,132, filed on Apr. 19, 2011.

(51) Int. Cl.
*G01B 21/22* (2006.01)
*B62D 15/02* (2006.01)

(56) References Cited

U.S. PATENT DOCUMENTS

| | | | |
|---|---|---|---|
| 5,142,278 A | 8/1992 | Moallemi et al. |
| 5,442,810 A | 8/1995 | Jenquin |
| 5,455,557 A | 10/1995 | Noll et al. |
| 5,905,433 A | 5/1999 | Wortham |
| 5,951,035 A | 9/1999 | Phillips, Jr. et al. |
| 5,970,619 A | 10/1999 | Wells |
| 6,100,795 A | 8/2000 | Otterbacher et al. |
| 6,151,175 A | 11/2000 | Osha |
| 6,178,650 B1 | 1/2001 | Thibodeaux |
| 6,217,177 B1 | 4/2001 | Rost |
| 6,318,747 B1 | 11/2001 | Ratican |
| 6,480,104 B1 | 11/2002 | Wall et al. |
| 6,837,432 B2 | 1/2005 | Tsikos et al. |
| 7,036,840 B2 | 5/2006 | Kwilinski |
| 7,204,504 B2 | 4/2007 | Gehring et al. |
| 7,237,790 B2 | 7/2007 | Gehring et al. |
| 7,309,075 B2 | 12/2007 | Ramsey et al. |
| 7,744,109 B2 | 6/2010 | Groh |
| 7,760,077 B2 | 7/2010 | Day |
| 8,010,252 B2 | 8/2011 | Getman et al. |
| 8,038,166 B1 | 10/2011 | Piesenger |
| 8,044,776 B2 | 10/2011 | Schofield et al. |
| 8,068,019 B2 | 11/2011 | Bennie et al. |
| 8,165,770 B2 | 4/2012 | Getman et al. |
| 8,179,238 B2 | 5/2012 | Roberts, Sr. et al. |
| 8,191,915 B2 | 6/2012 | Freese, V et al. |
| 8,362,888 B2 | 1/2013 | Roberts, Sr. et al. |
| 8,451,107 B2 | 5/2013 | Lu et al. |
| 8,755,984 B2 | 6/2014 | Rupp et al. |
| 8,930,140 B2 | 1/2015 | Trombley et al. |
| 2001/0024333 A1 | 9/2001 | Rost |
| 2002/0149673 A1 | 10/2002 | Hirama et al. |
| 2003/0234512 A1 | 12/2003 | Holub |
| 2004/0207525 A1 | 10/2004 | Wholey et al. |
| 2005/0074143 A1 | 4/2005 | Kawai |
| 2005/0128059 A1 | 6/2005 | Vause |
| 2006/0071447 A1 | 4/2006 | Gehring et al. |
| 2006/0250501 A1 | 11/2006 | Widmann et al. |
| 2007/0132560 A1 | 6/2007 | Nystrom et al. |
| 2007/0285808 A1 | 12/2007 | Beale |
| 2008/0180526 A1 | 7/2008 | Trevino |
| 2008/0231701 A1 | 9/2008 | Greenwood et al. |
| 2008/0231707 A1 | 9/2008 | Fontana |
| 2009/0093928 A1 | 4/2009 | Getman et al. |
| 2009/0271078 A1 | 10/2009 | Dickinson |
| 2010/0156667 A1 | 6/2010 | Bennie et al. |
| 2010/0324770 A1 | 12/2010 | Ramsey et al. |
| 2011/0025482 A1 | 2/2011 | Algueera et al. |
| 2011/0050903 A1 | 3/2011 | Vorobiev |
| 2011/0216199 A1 | 9/2011 | Trevino et al. |
| 2011/0257860 A1 | 10/2011 | Getman et al. |
| 2012/0185131 A1 | 7/2012 | Headley |
| 2012/0191285 A1 | 7/2012 | Woolf et al. |
| 2012/0200706 A1 | 8/2012 | Greenwood et al. |
| 2012/0265416 A1 | 10/2012 | Lu et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0288156 A1 | 11/2012 | Kido |
| 2013/0158803 A1 | 6/2013 | Headley |
| 2013/0207834 A1 | 8/2013 | Mizutani et al. |
| 2013/0226390 A1 | 8/2013 | Luo et al. |
| 2013/0268160 A1 | 10/2013 | Trombley et al. |
| 2014/0005918 A1 | 1/2014 | Qiang |
| 2014/0052337 A1 | 2/2014 | Lavoie et al. |
| 2014/0058655 A1 | 2/2014 | Trombley et al. |
| 2014/0085472 A1 | 3/2014 | Lu et al. |
| 2014/0172232 A1 | 6/2014 | Rupp et al. |
| 2014/0188344 A1 | 7/2014 | Lavoie |
| 2014/0200759 A1 | 7/2014 | Lu et al. |
| 2014/0222288 A1 | 8/2014 | Lavoie et al. |
| 2014/0277942 A1 | 9/2014 | Kyrtsos et al. |
| 2014/0297129 A1 | 10/2014 | Lavoie et al. |
| 2014/0343795 A1 | 11/2014 | Lavoie |

FOREIGN PATENT DOCUMENTS

| | | |
|---|---|---|
| DE | 9208595 U1 | 8/1992 |
| DE | 10030738 C1 | 8/2001 |
| DE | 10122562 C1 | 7/2002 |
| DE | 10154612 A1 | 5/2003 |
| DE | 10312548 B3 | 5/2004 |
| DE | 102006056408 A1 | 6/2008 |
| EP | 0418653 A1 | 3/1991 |
| EP | 1312492 A2 | 5/2003 |
| EP | 2644477 A1 | 10/2013 |
| JP | 2002012172 A | 1/2002 |
| JP | 2002068032 A | 3/2002 |
| JP | 2009171122 A | 7/2009 |
| JP | 2012166647 A | 9/2012 |
| WO | 2006042665 A1 | 4/2006 |
| WO | 2012103193 A1 | 8/2012 |
| WO | 2013048994 A1 | 4/2013 |
| WO | 2013070539 A1 | 5/2013 |

OTHER PUBLICATIONS

Alpine Electronics of America, Inc., "Alpine Electronics Introduces Two New Driver Assist Solutions", press release, Jan. 7, 2010, 2 pgs., Torrance, California.

Wagner, M.; Zobel, D.; Meroth, A., "An Adaptive Software and Systems Architecture for Drivers Assistance Systems based on Service Orientation", International Journal of Machine Learning and Computing, Oct. 2011, pp. 359-366, vol. 1, No. 4, Germany.

"Rearview Parking Assist Systems", Donmar Sunroofs & Accessories, Brochure, Aug. 2013, 13 pgs.

"TrailerVision", TrailerVision Ltd., Brochure, www.trailervision.co.uk, Date Unknown, 4 pgs.

TRAILER ANGLE DETECTION TARGET PLAUSIBILITY

CROSS-REFERENCE TO RELATED APPLICATIONS

This patent application is a continuation-in-part of U.S. patent application Ser. No. 14/301,919 which was filed on Jun. 11, 2014, entitled "TRAILER LENGTH ESTIMATION IN HITCH ANGLE APPLICATIONS" which is a continuation-in-part of U.S. patent application Ser. No. 14/294,489, which was filed on Jun. 3, 2014, entitled "TRAILER LENGTH ESTIMATION IN HITCH ANGLE APPLICATIONS," which is a continuation-in-part of U.S. patent application Ser. No. 14/289,888, which was filed on May 29, 2014, entitled "DISPLAY SYSTEM UTILIZING VEHICLE AND TRAILER DYNAMICS," which is a continuation-in-part of U.S. patent application Ser. No. 14/256,427, which was filed on Apr. 18, 2014, entitled "CONTROL FOR TRAILER BACKUP ASSIST SYSTEM." U.S. patent application Ser. No. 14/294,489 is also a continuation-in-part of U.S. patent application Ser. No. 14/257,420 which was filed on Apr. 21, 2014, entitled "TRAJECTORY PLANNER FOR A TRAILER BACKUP ASSIST SYSTEM," which is a continuation-in-part of U.S. patent application Ser. No. 14/256,427, which was filed on Apr. 18, 2014, entitled "CONTROL FOR TRAILER BACKUP ASSIST SYSTEM," which is a continuation-in-part of U.S. patent application Ser. No. 14/249,781, which was filed on Apr. 10, 2014, entitled "SYSTEM AND METHOD FOR CALCULATING A HORIZONTAL CAMERA TO TARGET DISTANCE," which is a continuation-in-part of U.S. patent application Ser. No. 14/188,213, which was filed on Feb. 24, 2014, entitled "SENSOR SYSTEM AND METHOD FOR MONITORING TRAILER HITCH ANGLE," which is a continuation-in-part of U.S. patent application Ser. No. 13/847,508, which was filed on Mar. 20, 2013, entitled "HITCH ANGLE ESTIMATION." U.S. patent application Ser. No. 14/188,213 is also a continuation-in-part of U.S. patent application Ser. No. 14/068,387, which was filed on Oct. 31, 2013, entitled "TRAILER MONITORING SYSTEM AND METHOD," which is a continuation-in-part of U.S. patent application Ser. No. 14/059,835, which was filed on Oct. 22, 2013, entitled "TRAILER BACKUP ASSIST SYSTEM," which is a continuation-in-part of U.S. patent application Ser. No. 13/443,743 which was filed on Apr. 10, 2012, entitled "DETECTION OF AND COUNTERMEASURES FOR JACKKNIFE ENABLING CONDITIONS DURING TRAILER BACKUP ASSIST," which is a continuation-in-part of U.S. patent application Ser. No. 13/336,060, which was filed on Dec. 23, 2011, entitled "TRAILER PATH CURVATURE CONTROL FOR TRAILER BACKUP ASSIST," which claims benefit from U.S. Provisional Patent Application No. 61/477,132, which was filed on Apr. 19, 2011, entitled "TRAILER BACKUP ASSIST CURVATURE CONTROL." U.S. patent application Ser. No. 14/249,781 is also a continuation-in-part of U.S. patent application Ser. No. 14/161,832 which was filed Jan. 23, 2014, entitled "SUPPLEMENTAL VEHICLE LIGHTING SYSTEM FOR VISION BASED TARGET DETECTION," which is a continuation-in-part of U.S. patent application Ser. No. 14/059,835 which was filed on Oct. 22, 2013, entitled "TRAILER BACKUP ASSIST SYSTEM." Furthermore, U.S. patent application Ser. No. 14/249,781 is a continuation-in-part of U.S. application Ser. No. 14/201,130 which was filed on Mar. 7, 2014, entitled "SYSTEM AND METHOD OF CALIBRATING A TRAILER BACKUP ASSIST SYSTEM," which is a continuation-in-part of U.S. patent application Ser. No. 14/068,387, which was filed on Oct. 31, 2013, entitled "TRAILER MONITORING SYSTEM AND METHOD." The aforementioned related applications are hereby incorporated by reference in their entirety.

FIELD OF THE INVENTION

The disclosure made herein generally relates to driver assist systems in vehicles, and more particularly to a trailer backup system employing image based target direction.

BACKGROUND OF THE INVENTION

Some trailer backup assist systems implement image based target detection to monitor the position of a target to determine a hitch angle between a tow vehicle and a trailer. In some instances, image based target detection can mistakenly image an unreliable or false target, which results in erroneous hitch angle calculations. In view of this shortcoming, a system and method for determining target plausibility is disclosed herein.

SUMMARY OF THE INVENTION

According to one aspect of the present invention, a system for determining target plausibility is comprised of an imaging device for imaging a scene and generating image data, sensors for generating hitch angle measurements, steering angle measurements, and vehicle speed measurements. A controller in communication with the imaging device and the sensors, wherein when a driving condition is satisfied, the controller calculates a hitch angle and selects a plausible target from the imaged scene based on the image data and the calculated hitch angle.

According to another aspect of the present invention, a method for determining target plausibility is comprised of an imaging scene and generating image data, generating hitch angle measurements, steering angle measurements, and vehicle speed measurements, calculating a hitch angle when a driving condition is satisfied, and selecting a plausible target from the imaged scene based on the image data and the calculated hitch angle.

According to yet another aspect of the present invention, a method for determining target plausibility is comprised of the steps of imaging a scene and generating image data, detecting at least one target in the imaged scene, calculating a hitch angle when a hitch angle rate, a steering rate, and a vehicle speed measurement each satisfy a threshold requirement and determining if the at least one target is plausible based on the image data and the calculated hitch angle.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
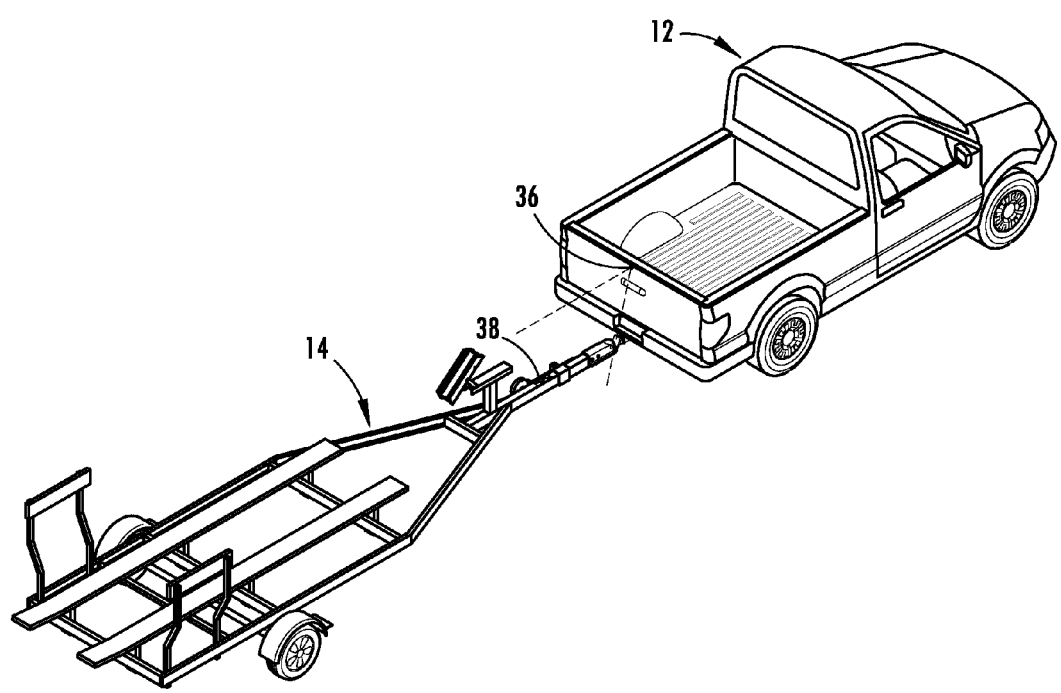
FIG. 1 illustrates a vehicle and trailer combination equipped with a trailer backup assist system that employs image based target detection.

The disclosed subject matter is directed to a system and method for determining target plausibility and may be used in conjunction with a trailer backup assist system employing image based target detection as a means to determine a hitch angle between a tow vehicle and a trailer attached thereto. As exemplarily shown in FIG. 1, an imaging device 36 is installed in the rear of a tow vehicle 12 and can be used to image a rear vehicle scene containing a target 38 on a trailer 14. The target 38 can have a checkered or other pattern and is typically provided in a fixed location on the trailer 14 so that its position in the imaged scene is dictated by the orientation of the trailer 14 relative to the towing vehicle 12. Thus, by using image based target detection to track the position of the target within the imaged scene, the hitch angle between the vehicle 12 and trailer 14 can be determined. In some instances however, image based target detection can fail when the imaging device 36 images an unreliable target or a false target. In such scenarios, the trailer backup assist system may make an incorrect hitch angle determination. Recognizing this, a system and method is disclosed herein that distinguishes between a plausible target and an implausible target for the purpose of image based target detection.

Figure 2:
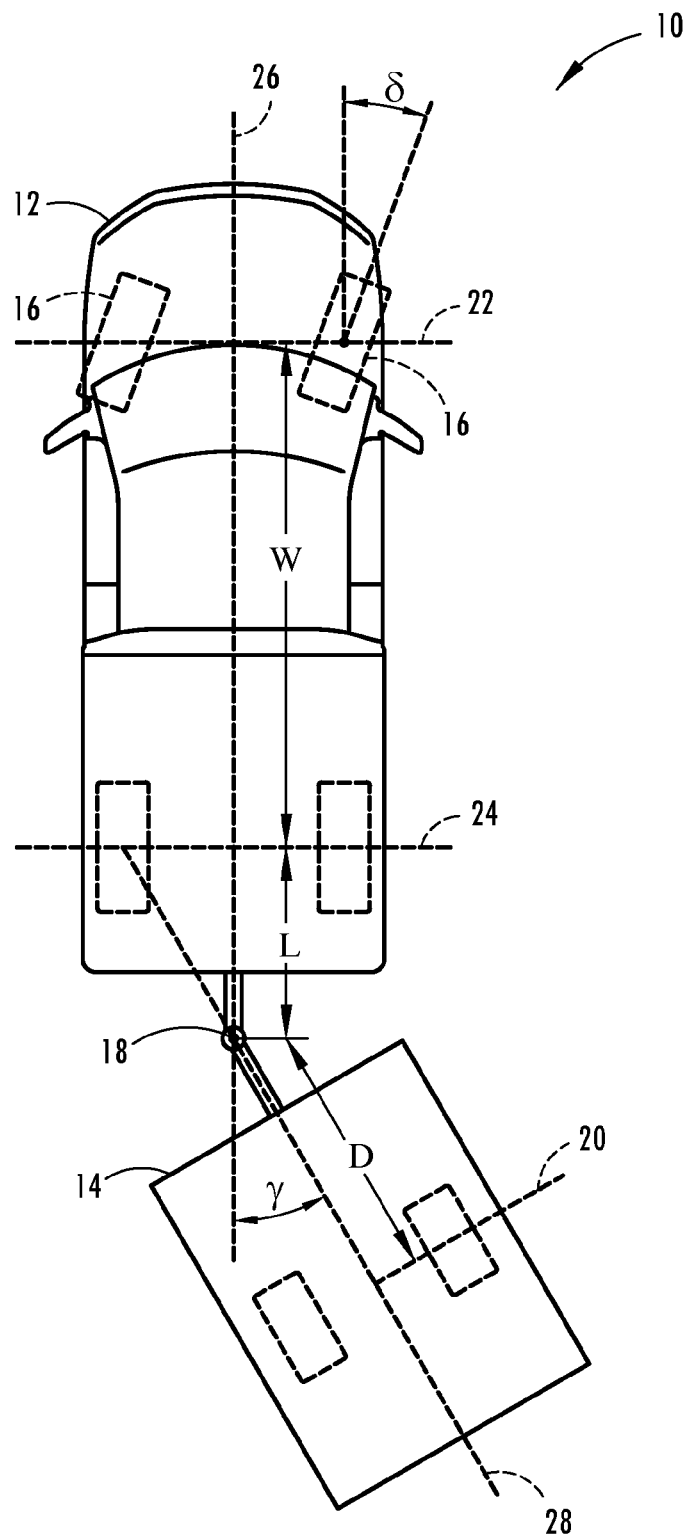
FIG. 2 illustrates a kinematic model between a tow vehicle and an attached trailer.

In FIG. 2, a kinematic model 10 of a tow vehicle 12 and trailer 14 combination is shown having kinematic variables and angles, including a steering angle $\delta$, a trailer length D, and a hitch angle $\gamma$, which may be affected by the dynamics of the vehicle 12 and trailer 14 combination and representable in kinematic equations. When the hitch angle $\gamma$ and steering angle $\delta$ are substantially constant, the yaw rate of the vehicle 12 is also substantially constant and equal to the yaw rate of the trailer 14. This interaction is used to formulate kinematic equations that can be solved for determining the hitch angle $\gamma$ between the vehicle 12 and the trailer 14. Specifically, the yaw rate of the vehicle 120, as measured by a yaw rate sensor or other onboard vehicle sensor, provides the following equation:

$$\frac{d\alpha}{dt} = -\frac{v}{W}\tan\delta$$

Furthermore, the yaw rate of the trailer can be represented with the following equation:

$$\frac{d\beta}{dt} = \frac{v}{D}\sin\gamma + \frac{Lv}{DW}\cos\gamma\tan\delta$$

Where,
$\delta$ is the steering angle of the front wheels 16 of the vehicle 12;
D is the length from the hitch point 18 to the trailer axle 20, referred to herein as the hitch to trailer axle length; W is the length from the front axle 22 of the vehicle 12 to the rear axle 24 of the vehicle 12, referred to herein as the wheelbase length;
L is the length from the hitch point 18 to the rear axle 24 of the vehicle 12, referred to herein as the hitch to rear vehicle axle length; and
$\gamma$ is a hitch angle, as measured between a centerline longitudinal axis 26 of the vehicle 12 and a centerline longitudinal axis 28 of the trailer 14.

Accordingly, when the yaw rate of the vehicle 12 and the trailer 14 become equal, the hitch angle $\gamma$ will likely be constant. This condition can occur when a driver attempts to reverse the trailer vehicle 12 and trailer 14 in a straight line with the vehicle or when the driver inputs a maximum steering command through a vehicle steering input device such as a steering wheel, a rotatable knob, a touchscreen device, the like, or a combination thereof. In either scenario, the resulting constant hitch angle $\gamma$ can be described using the following equation:

$$c = a\cos\gamma + b\sin\gamma$$

This equation can be rewritten as follows:

$$c = a\sqrt{1-\sin^2\gamma} + b\sin\gamma$$

The above equation can be rearranged into quadratic form and rewritten as follows:

$$c^2 - a^2 - 2bc\sin\gamma + (b^2 a^2)\sin\gamma = 0$$

Solving the quadratic equation for the hitch angle $\gamma$ yields the following hitch angle equation:

$$\gamma = \arcsin\frac{bc \pm a\sqrt{b^2 + a^2 - c^2}}{b^2 + a^2}$$

Where, $$c = -\frac{1}{W}\tan\delta$$

$$b = \frac{1}{D}$$

$$a = \frac{L}{DW}\tan\delta$$

Accordingly, the hitch angle $\gamma$ may be determined as a function of the hitch to trailer axle length D, the wheelbase length W, the hitch to rear axle length L, and the steering angle $\delta$ when the vehicle 12 and trailer 14 are reversing and that the yaw rate of the vehicle 12 and the trailer 14 are substantially equal during the reversing motion for at least a threshold period of time or over a threshold distance of motion.

Figure 3:
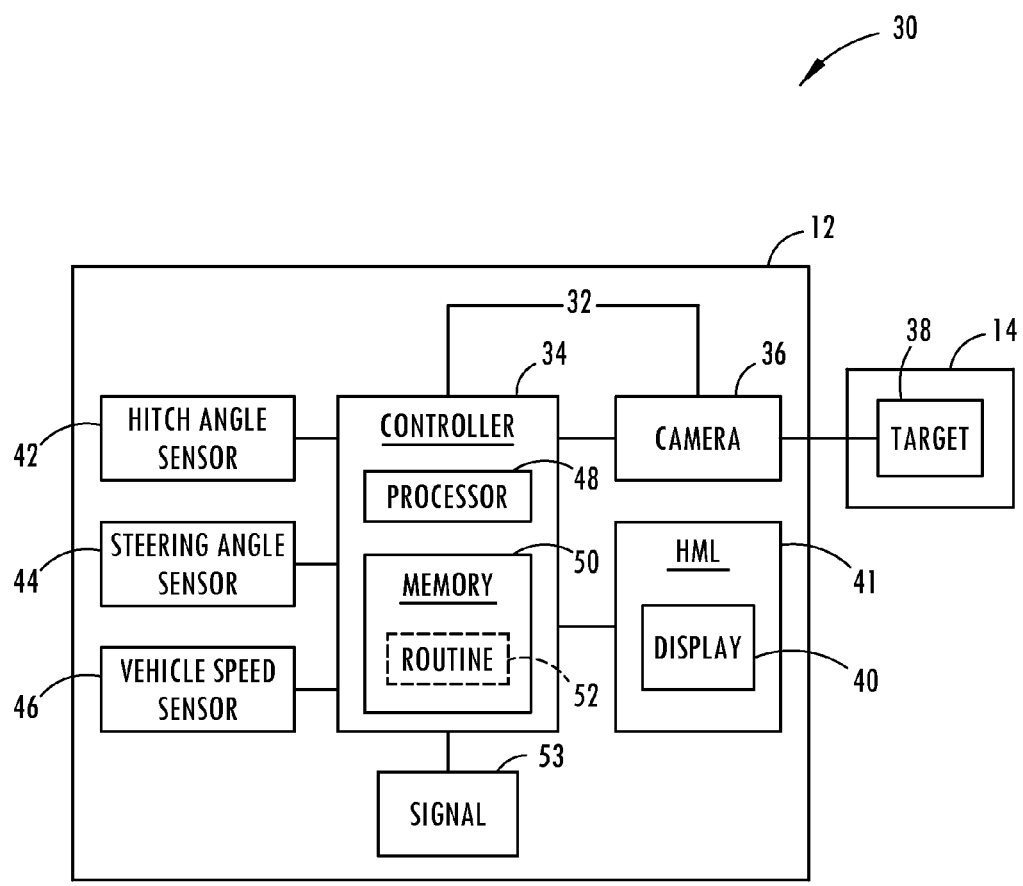
FIG. 3 illustrates a block diagram of a system for determining target plausibility according to one embodiment.

Referring to FIG. 3 a block diagram is shown of a system 30 for determining target plausibility. The system 30 can be combined or in communication with a trailer backup assist system and includes an imaging module 32 having a controller 34 and an imaging device 36. In one implementation, the imaging device 36 can be configured to image a target 38 that is located on the trailer 14. Image data generated from the imaging device 36 can be received and processed by the controller 34 to produce an image on a display 40. The display 40 can be part of a human machine interface (HMI) 41 that is implemented in the vehicle 12 and may include a plurality of user inputs to enable a user to input a variety of commands related to the trailer backup assist system and/or other systems and/or modules onboard the vehicle 12.

The controller 34 can communicate with one or more data collection devices and/or modules configured to receive information corresponding to the hitch angle γ the steering angle δ, and the velocity of the vehicle 12. With respect to the illustrated embodiment, the controller 34 is shown in communication with a hitch angle sensor 42, a steering angle sensor 44, and a vehicle speed sensor 46. The hitch angle sensor 42 can include mechanical sensor mechanisms or other conceivable hitch angle sensors and can be located on the vehicle 12 and/or the trailer 14. Additionally, the hitch angle sensor 42 can provide the controller 34 with hitch angle measurements. The hitch angle measurements can be supplied to the controller 34 via a communication network of the vehicle 12, which can include a controller area network (CAN), a local interconnect network (LIN), or other popular protocols used in the automotive industry. Likewise, the steering angle sensor 44 and the vehicle speed sensor 46 can also supply information to the controller 34 via the communication network of the vehicle 12. The steering angle sensor 44 can be a component of a power steering control module of the vehicle 12 and can provide the controller 34 with steering angle measurements. The vehicle speed sensor 46 can be a component of an engine control module of the vehicle 12 and can provide the controller 34 with vehicle speed measurements. Although the abovementioned measurements are described as being received from specific equipment, it should be appreciated that the measurements can be received from any devices implemented by a trailer backup assist system to monitor the kinematic properties of the vehicle 12 and the trailer 14. Furthermore, it should be appreciated that the controller 34 can be in communication with other equipment used in conjunction with a trailer backup assist system and/or other vehicle system.

As is further shown in FIG. 3, the controller 34 can include at least one processor 48 and a memory 50 storing one or more routines 52 executable by the processor 48. The processor 48 can be configured to process image data received from the imaging device 36 and any data received from the hitch angle sensor 42, the steering angle sensor 44, and the vehicle speed sensor 46. Additionally, the processor 48 can be configured to output one or more signals 53 based on any of the data inputted from the imaging device 36, the HMI 41, the hitch angle sensor 42, the steering angle sensor 44, and/or the vehicle speed sensor 46. The outputted signal(s) 53 can be supplied to a trailer backup assist system and/or other vehicle system to control a function of the vehicle 12.

Figure 4:
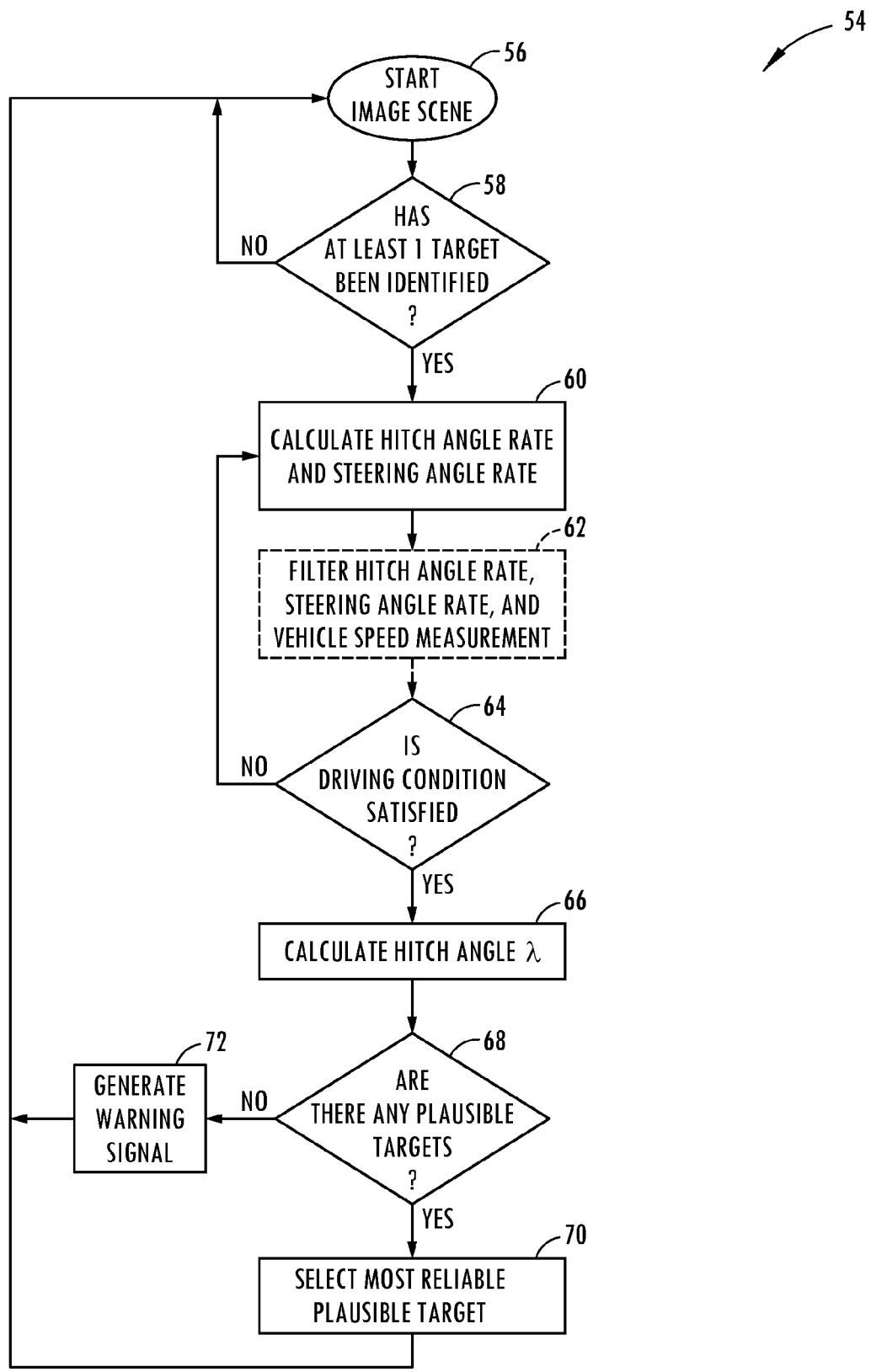
FIG. 4 illustrates a flow diagram of a method for determining target plausibility according to one embodiment.

Referring to FIG. 4, a flow diagram of a method 54 for determining target plausibility is shown. For purposes of illustration, and not limitation, the method 54 is described as being implemented by system 30 and can be embodied as a routine 52 stored in the memory 50 of the controller 34 and executable by the processor 48. While the steps are described below in a linear manner, it should be appreciated that each step does not necessarily need to be performed in the order in which it is presented and some steps may be omitted altogether. As exemplarily shown in FIG. 4, the method 54 can begin at step 56, where the processor 48 prompts the imaging device 36 to image a scene to the rear of the vehicle 12. In step 58, the processor 48 analyzes the image data to determine if one or more targets 38 appear in the imaged scene. If at least one target 38 is detected, the processor 48 calculates a hitch angle rate and a steering angle rate in step 60 using hitch angle measurements and steering angle measurements received from the hitch angle sensor 42 and the steering angle sensor 44, respectively. Optionally, in step 62, the processor 48 can filter the hitch angle rate and the steering angle rate, as calculated in step 60, in order to reduce noise. The processor 48 can also filter a vehicle speed measurement received from the vehicle speed sensor 46.

In step 64, the processor 48 checks if a driving condition is satisfied. According to one implementation, the driving condition is characteristic of a moving vehicle having a substantially constant hitch angle γ and steering angle δ. Satisfaction of the driving condition can be determined based on a comparison of the filtered or unfiltered hitch angle rate, steering angle rate, and vehicle speed measurements to associated threshold values, irrespective of whether the vehicle 12 is moving forward or backward. For example, the driving condition can be satisfied when the absolute value of the hitch angle rate is below a hitch angle rate threshold (e.g. 0.3 degrees/second), the absolute value of the steering angle rate is below a steering angle rate threshold (e.g. 0.3 degrees/second), and the absolute value of the vehicle speed is above a vehicle speed threshold (e.g. 5 km/hour). If the driving condition is satisfied, the processor 48 calculates a hitch angle γ in step 66 or otherwise returns to step 60. The hitch angle γ can be calculated using the hitch angle equation and based on the steering angle δ received from the steering angle sensor 44, the hitch to trailer axle length D, the wheelbase length W, and the hitch to rear axle distance L. The hitch to trailer axle length D, the wheelbase length W, and the hitch to rear axle distance L are generally known values that may be pre-stored to the memory 50 of the controller 34 or otherwise inputted and stored to the memory 50 via a user input device (e.g. HMI 41).

In step 68, the processor 48 determines if any of the targets 38 detected in step 58 are plausible targets. A target 38 can be considered plausible if analysis of the image data shows that the position of the target 38 in the imaged scene is consistent with an expected target position based on the hitch angle γ calculated in step 66. When all plausible targets have been determined, the processor 48, in step 70, can select the one that is most consistently located at the expected target position over a predetermined time period and/or range of calculated hitch angles γ. Consequently, the processor 48 can directly implement target-related functions (e.g. image based target detection) using the selected plausible target or may instead send a signal (e.g. signal 53) to the trailer backup assist system indicating its selection. The trailer backup assist system may then decide whether to use the selected plausible target for target-related functions. If the processor 48 is unable to determine any plausible targets, the processor 48 can generate a signal (e.g. signal 53) in step 72 that can be used to notify a vehicle operator that no plausible target has been identified. The notification can be auditory, visual, and/or haptic, and may be implemented via any suitable equipment related to the trailer backup assist system or onboard the vehicle 12. Upon the completion of either step 70 or 72, the processor can return to step 56 to initiate another pass through.

Accordingly, a system and method for determining target plausibility have been advantageously described herein and are generally intended for use with a trailer backup assist system to enable a plausible target to be distinguished from an unreliable or false target for the purpose of image based target detection or other target-related functions.

What is claimed is:

1. A system for determining target plausibility, comprising:
   an imaging device for imaging a scene and generating image data;
   sensors for generating hitch angle measurements, steering angle measurements, and vehicle speed measurements; and
   a controller in communication with the imaging device and the sensors, wherein when a driving condition is satisfied, the controller calculates a hitch angle and selects a plausible target from the imaged scene based on the image data and the calculated hitch angle.

2. The system of claim 1, wherein the calculated hitch angle is based on the steering angle, a hitch to trailer axle length, a wheelbase length, and a hitch to rear vehicle axle length.

3. The system of claim 1, wherein the controller is configured to calculate a steering angle rate and a hitch angle rate based on the steering angle measurements and the hitch angle measurements.

4. The system of claim 3, wherein the driving condition is satisfied when the hitch angle rate, the steering angle rate, and a vehicle speed measurement each satisfy a threshold requirement.

5. The system of claim 4, wherein the controller calculates the hitch angle when an absolute value of the hitch angle rate and steering angle rate are each below an associated threshold value and an absolute value of the vehicle speed measurement is above an associated threshold value.

6. The system of claim 5, wherein the controller is further configured to analyze the image data and select, as the plausible target, a target appearing in the imaged scene having a position that is consistent with an expected target position based on the calculated hitch angle.

7. A method for determining target plausibility, comprising the steps of:
   imaging a scene and generating image data;
   generating hitch angle measurements, steering angle measurements, and vehicle speed measurements;
   calculating a hitch angle when a driving condition is satisfied; and
   selecting a plausible target from the imaged scene based on the image data and the calculated hitch angle.

8. The method of claim 7, further comprising the step of calculating a hitch angle rate and a steering angle rate based on the hitch angle measurements and the steering angle measurements.

9. The method of claim 8, further comprising the step of filtering the hitch angle rate, the steering angle rate, and a vehicle speed measurement.

10. The method of claim 8, further comprising the step of taking an absolute value of the hitch angle rate, the steering angle rate, and a vehicle speed measurement.

11. The method of claim 10, further comprising the step of comparing the absolute value for each of the hitch angle rate, the steering angle rate, and the vehicle speed measurement to an associated threshold value.

12. The method of claim 11, wherein the driving condition is satisfied when the absolute value of the hitch angle rate and steering angle rate are each below the associated threshold value and an absolute value of the vehicle speed measurement is above the associated threshold value.

13. The method of claim 12, further comprising the step of analyzing the image data and selecting, as the plausible target, a target appearing in the imaged scene having a position that is consistent with an expected target position based on the calculated hitch angle.

14. The method of claim 13, further comprising the step of implementing target-related functions using the selected plausible target.

15. A method for determining target plausibility, comprising the steps of:
   imaging a scene and generating image data;
   detecting at least one target in the imaged scene;
   calculating a hitch angle when a hitch angle rate, a steering rate, and a vehicle speed measurement each satisfy a threshold requirement; and
   determining if the at least one target is plausible based on the image data and the calculated hitch angle.

16. The method of claim 15, wherein the threshold requirement is satisfied when the hitch angle rate and the steering angle rate are each below an associated threshold value and the vehicle speed measurement is above an associated threshold value.

17. The method of claim 15, wherein the step of determining further comprises analyzing the image data and identifying, as a plausible target, each target appearing in the imaged scene having a position that is consistent with an expected target position based on the calculated hitch angle.

18. The method of claim 17, further comprising the step of selecting, as the plausible target, the target that is most consistently located at the expected target position over a predetermined time period and/or range of calculated hitch angles.

19. The method of claim 18, further comprising the step of implementing target-related functions using the selected plausible target.

20. The method of claim 19, wherein the calculated hitch angle is based on a steering angle, a hitch to trailer axle length, a wheelbase length, and a hitch to rear vehicle axle length.

* * * * *